3,261,786
MODIFIED VINYL CHLORIDE POLYMERS
David S. Breslow, Wilmington, Del., assignor to Hercules Incorporated, a corporation of Delaware
No Drawing. Filed June 25, 1963, Ser. No. 290,328
10 Claims. (Cl. 260—2.5)

This invention relates to modifying polymers and to the products so produced. More particularly, the invention relates to modifying vinyl chloride polymers with aromatic polysulfonazides and to the products so produced.

In the past, polyvinyl chloride has been crosslinked, i.e., vulcanized, with various cross-linking agents such as, for example, a combination of a peroxide and bis-(maleimide). However, the resulting products were all deficient in certain respects such as viscous flow (creep), solubility, fusibility, etc.

Now in accordance with this invention it has unexpectedly been found that vinyl chloride polymers can be cross-linked by heating in the presence of an aromatic polysulfonazide to give a thermoset product which is tough, resilient, solvent-resistant and free from viscous flow and odor. In addition, the instant invention permits the use of lower molecular weight, easier processing vinyl chloride polymers than would otherwise be operable. Another advantage of this invention is its adaptability to the preparation of foamed vinyl chloride polymers. Still another advantage is that the vinyl chloride polymer can be treated with smaller amounts of the sulfonazide to improve its properties without materially affecting its solubility.

Any aromatic polysulfonazide as defined below can be used in the process of this invention. The aromatic polysulfonazide will contain at least 2 sulfonazide groups but can contain up to 50 or more nonadjacent sulfonazide groups. In all cases the sulfonazide groups will be attached directly to the aromatic ring or rings. In addition to the sulfonazide groups, these compounds can also contain ether, sulfide, ester, halo, etc., groups which are inert to the modification reaction. Most preferably the aromatic polysulfonazide will have a solubility of at least about 1.0% by weight in n-heptane at a temperature of 95° C. Exemplary aromatic polysulfonazides are 1,3-benzene bis(sulfonazide), 1-octyl-2,4,6-benzene tris(sulfonazide), 3,5-toluene bis(sulfonazide), 4,4'-diphenyl ether bis(sulfonazide), 4,4'-bis(octadecyl) biphenyl-3,5, 3',5'-tetra(sulfonazide), 4,4'-diphenyl sulfide bis(sulfonazide), 1,6-bis(4'-sulfonazidophenyl)hexane, 2,7-naphthalene bis(sulfonazide), poly(sulfonazidostyrene), etc.

Any vinyl chloride polymer, homopolymer or copolymer containing at least about 20 mole percent of vinyl chloride can be modified in accordance with this invention. Exemplary of these polymers are polyvinyl chloride, vinyl chloride-vinyl acetate copolymers, vinyl chloride-vinylidene chloride copolymers, vinyl chloride-acrylonitrile copolymers, vinyl chloride-vinyl acetal copolymers, vinyl chloride-1,2-ethylene dicarboxylic acid alkyl ester copolymers such as vinyl chloride-diethyl fumarate copolymers, vinyl chloride-diethyl maleate copolymers, vinyl chloride-vinylidene chloride-acrylonitrile terpolymers, etc. The polymers to be modified can be either a plastisol grade or plastic grade, since modification by the process of this invention is equally adaptable to either type. Those polymers containing at least 60 mole percent vinyl chloride are most preferred.

The modification process of this invention can be carried out by heating the vinyl chloride polymer in the presence of the polysulfonazide to a temperature at which the sulfonazide decomposes. This temperature varies over a wide range but in general will be from about 120° C. to about 250° C., most preferably from about 150° C. to about 230° C. Various amounts of the polysulfonazide can be added, the optimum amount depending on the amount of cross-linking or other modification desired, the specific aromatic polysulfonazide employed, etc. In general, the amount added, based on the weight of the vinyl chloride polymer, will be from about 0.01% to about 20% and, most preferably, from about 0.1% to about 10%.

The aromatic polysulfonazide can be incorporated with the vinyl chloride polymer in any desired fashion. For example, it can be uniformly blended by simply milling on a conventional rubber mill, by extrusion mixing or dissolved in a solution containing the polymer. By any of these means, the aromatic polysulfonazide is distributed throughout the polymer and uniform cross-linking or other modification is effected when the blend is subjected to heat. Other methods of mixing the polysulfonazide with the polymer will be apparent to those skilled in the art.

In addition to the aromatic polysulfonazide, other ingredients can also be incorporated, as, for example, extenders, fillers, pigments, plasticizers, processing aids, stabilizers, blowers (discussed below), etc. Obviously, there are many cases in which other additives are not required or desired and excellent results are achieved when only the polysulfonazide is added.

The process of this invention is particularly advantageous in the preparation of modified polyvinyl chloride foams. Using this process, it is possible to produce either rigid or flexible foams of any desired density having uniform closed cell structures or open cell structures.

Any of the well-known chemical blowing agents can be used in the preparation of the foams. Exemplary blowing agents are azodicarbonamide, N,N'-dinitrosopentamethylene tetramine, N,N'-dimethyl-N,N'-dinitrosoterephthalamide, p,p'-oxy-bis(benzene sulfonyl semicarbazide, p,p'-oxy-bis(benzene sulfonyl hydrazide), p,p'-diphenyl-bis(sulfonyl hydrazide), benzene-sulfonyl hydrazide, n-benzene-bis(sulfonyl hydrazide), etc. The well-known solvent blowing agents such as butane, hexane, chloroform, trichloroethylene, etc., can also be used in the preparation of these foams. Low boiling polyhalogenated compounds such as monochlorotrifluoromethane, monochlorodifluoromethane, dichlorotetrafluoroethylene, etc., are particularly useful in preparing foams exhibiting superior insulating properties. Accordingly, any compound which decomposes or volatilizes to yield at least one mole of gas per mole of blowing agent at a temperature of 190° C. or less can be used.

Various types of foams can be prepared from the vinyl chloride polymers described above depending upon the specific one used. For example, polyvinyl chloride yields rigid and semi-rigid foams. Flexible foams are obtained from polyvinyl chloride plastisols and the vinyl chloride copolymers.

In preparing foams in accordance with this invention, the vinyl chloride polymer is first blended with an aromatic polysulfonazide and a blowing agent. Any desired means can be made for bringing about this blending. When a solvent blowing agent is used, a convenient method for forming the desired expandable blend is to mix the vinyl chloride polymer and polysulfonazide, pass the mixture through an extruder to form pellets which then are soaked in the solvent blowing agent until the desired amount of the latter has been absorbed. When a chemical blowing agent is used, the polysulfonazide and blowing agent can be mixed with a diluent (which can also contain a stabilizer or other modifier for the vinyl chloride polymer) and then the polymer in finely divided form can be added and mixed into a slurry. On evaporation of the diluent, an intimate mixture of the polymer, blowing agent, and polysulfonazide is obtained. When a polyvinyl chloride plastisol is used, the polysulfonazide and blowing agent can readily be mixed into the dispersion.

The modifying and blowing of the above-described expandable blends is then carried out by heating the blend to a temperature from about 120° C. to about 250° C. The period of time required to effect the desired degree of blowing will depend on the temperature used, etc., but will usually be about 1–10 minutes. The exact temperature to be used will then depend on the polysulfonazide and blowing agent used, the length of time the blend is heated, etc. The modification and blowing usually takes place simultaneously but may take place sequentially depending on the type of foaming process used. Where blowing is conducted in an open vessel, cross-linking will usually be required to prevent the foam from collapsing but must not be complete before expansion. Obviously, best results can be obtained when using a sulfonazide and blowing agent which decompose (or volatilize in the case of the solvent blower) at about the same temperature.

The amount of aromatic polysulfonazide used in the preparation of the foams will preferably be from about 0.1% to about 10.0% by weight of the polymer, although higher concentrations can be used if desired. The amount of blowing agent incorporated will obviously depend on the degree of blowing desired; that is, the density desired for the final foamed product and the type of blowing agent used. In general, when using a chemical blowing agent, the amount will be within the range of from about 0.5% to about 20% by weight of the polymer. When using a solvent blowing agent, the amount will be within the range of from about 5% to about 30% by weight of the polymer.

The following examples are presented for purposes of illustration, parts and percentages being by weight unless otherwise specified. The extent of cross-linking is indicated by the resulting vulcanizates' insolubility in (expressed as percent gel) and swelling by (expressed as percent swell) chlorobenzene which is a complete solvent for the polymers and the uncross-linked compounds. Percent gel is indicative of the percentage of polymer that is cross-linked and percent swell is inversely proportional to the cross-link density.

In all of the examples, percent gel and swell were determined as follows: A one-half inch diameter by 0.050 inch thick disc-shaped specimen was weighed and macerated in 60 cc. of chlorobenzene for 4 hours at 80° C. The swollen sample was then blotted free of excess chlorobenzene and promptly weighed in the swollen condition. The specimen was then dried in vacuum for 4 hours at 80° C. and reweighed. The initial, swollen and dry weights were each corrected (for non-polymer components of the specimen) to a 100% polymer base. From these figures, percent gel is calculated by the formula $$\frac{\text{Corrected dry weight}}{\text{Corrected initial weight}} \times 100 = \text{percent gel}$$

Similarly, percent swell is calculated by the formula $$\frac{\text{Corrected swollen weight} - \text{corrected dry weight}}{\text{Corrected dry weight}} \times 100 = \text{percent swell}$$

Example 1

An aromatic bis-sulfonazide was prepared by reacting 1,3-benzene bis(sulfonyl chloride) with sodium azide. The resulting 1,3-benzene bis(sulfonazide) had a solubility of 2% by weight in n-heptane at a temperature of 95° C. and a half-life of 11 minutes at a temperature of 157° C. To 100 parts of a vinyl chloride-vinyl acetate copolymer containing 85% by weight of vinyl chloride and having a specific gravity of 1.36 at 25° C. and a specific viscosity of 0.56 as determined at 20° C. on a 1% solution in methylisobutyl ketone was added 10 parts of the 1,3-benzene bis(sulfonazide). This mixture was blended on a two-roll mill at a temperature of 95° C. for 5 minutes. Specimens 1 x 4 x 0.050 inch were cured between steel plates under a pressure of 1500 p.s.i. at a temperature of 145° C. for 45 minutes. The resulting tough vulcanizate was insoluble in chlorobenzene. A sample of the vinyl chloride-vinyl acetate copolymer treated in the exact same way except for the addition of the bis(sulfonazide) was completely soluble in chlorobenzene.

Examples 2 and 3

Two samples of a polyvinyl chloride having a specific gravity of 1.40 at 25° C. and a specific viscosity of 0.60 as determined at 20° C. on a 1% solution in methylisobutyl ketone were cross-linked with different amounts of the 1,3-benzene bis(sulfonazide) described in Example 1. Each sample (in the form of finely divided powder) was slurried in sufficient toluene to form an easy-mixing paste. To each slurry was added an amount of 1,3-benzene bis(sulfonazide) and the toluene allowed to evaporate over night. The resulting dry powder was compression molded for 50 minutes at a temperature of 150° C. A control sample was treated in exactly the same way except for the addition of 1,3-benzene bis(sulfonazide). The amount of sulfonazide added to each sample (expressed as parts per hundred of polymer) and the percent gel and swell of the resulting products are tabulated below:

| Example | Pph. Sulfonazide | Percent Gel | Percent Swell |
|---|---|---|---|
| 2 | 10 | 91 | 215 |
| 3 | 5 | 90 | 300 |
| Control | 0 | 0 | ∞ |

Example 4

A polyvinyl chloride plastisol was prepared by blending equal parts by weight of the finely divided polyvinyl chloride described in Examples 2 and 3 with liquid polyester prepared from adipic acid and ethylene glycol. To the plastisol dispersion was added 5 parts per hundred of dibasic lead phthalate stabilizer and 2.5 parts per hundred of the 1,3-benzene bis(sulfonazide) described in Example 1. The mixture was poured into an iron mold and compression molded for 55 minutes at a temperature of 150° C. The resulting tough film was suitable for use as imitation leather.

Examples 5 and 6

Two samples of the polyvinyl chloride described in Examples 2 and 3 were compounded on a two roll mill at a temperature of 105° C. with a processing aid, a stabilizer and 1,6-bis(4'-sulfonazidophenyl) hexane. The amounts of the ingredients (by parts) in each formulation are tabulated below:

| Example | Polyvinyl chloride | Dibasic lead phthalate | Liquid polyester | Polysulfonazide |
|---|---|---|---|---|
| 5 | 10 | 1 | 0.5 | 0.5 |
| 6 | 10 | 1 | 0.5 | 1.0 |
| Control | 10 | 1 | 0.5 | 0 |

Both samples and the control were compression molded as described in Examples 2 and 3. The percent gel and swell of both samples and the control were determined and are tabulated below:

| Example | Percent Gel | Percent Swell |
|---|---|---|
| 5 | 74 | 560 |
| 6 | 95 | 225 |
| Control | 0 | ∞ |

Examples 7–9

These examples show the preparation of flexible foams from polyvinyl chloride plastisols, blowing agents and the 1,3-benzene bis(sulfonazide) described in Example 1.

The amounts of the ingredients (by parts) in each formulation are tabulated below:

|  | Examples | | | |
|---|---|---|---|---|
|  | 7 | 8 | 9 | Control |
| Polyvinyl chloride a | 10 | 10 | 10 | 10 |
| Dibasic lead phthalate | 1 | 1 | 1 | 1 |
| Liquid polyester b | 7 | 7 | 10 | 7 |
| Epoxidized soya oil | 3 | 3 | 0 | 3 |
| Azodicarbonamide | 0.5 | 0 | 0 | 0 |
| p,p'-Oxybis (benzene sulfonyl hydrazide) | 0 | 0.5 | 0 | 0 |
| N,N'-Dinitrosopentamethylene tetramine | 0 | 0 | 1.5 | 0 |
| 1,3-benzene bis (sulfonazide) | 1.0 | 0.25 | 1.0 | 0 | a The polymer described in Examples 2 and 3.
b Described in Example 4.

Each formulation was poured into an open beaker and heated for one half hour at a temperature of 160° C. The resulting modified flexible foams were of uniform closed-cell structure. The control after the above treatment was a soft, tan colored solid. The foams and the control were tested to determine their density in pounds per cubic foot, volume expansion $$\left(\frac{\text{final volume}}{\text{initial volume}} \times 100\right)$$

and percent gel. The results are tabulated below:

|  | 7 | 8 | 9 | Control |
|---|---|---|---|---|
| Density | 49 | 10 | 18 | 91 |
| Volume expansion, percent | 200 | 840 | 520 | 0 |
| Percent Gel | 106 | 22 | 97 | 0 |

*Example 10*

A sample of polyvinyl chloride having a specific gravity of 1.40 at 25° C. and a specific viscosity of 0.55 as determined at 20° C. on a 0.4% solution in nitrobenzene was compounded on a two roll mill with processing aids, carbon black and the 1,3-benzene bis(sulfonazide) described in Example 1. The amounts of the ingredients (by parts) are tabulated below:

Ingredients: Parts
  Polyvinyl chloride _____ 70
  Dioctyl phthalate _____ 30
  High abrasion furnace black _____ 35
  1,3-benzene-bis(sulfonazide) _____ 3.5
  Potassium stearate _____ 3.0

The resulting mixture was compression molded for 1 hour at a temperature of 175° C. under a pressure of 2000 p.s.i. A sample of the vulcanizate was tested for percent gel and swell and found to have a percent gel of 88 and a percent swell of 769.

*Example 11*

A vinyl chloride-vinyl acetate-maleic acid terpolymer coating composition was cross-linked with 1,3-benzene bis (sulfonazide). The formulation of the composition is tabulated below:

Ingredients: Parts
  Vinyl chloride-vinyl acetate-maleic acid terpolymer (containing 13% vinyl acetate, 86% vinyl chloride and 1% maleic acid) _____ 20
  Butyl acetate _____ 80
  1,3-benzene-bis(sulfonazide) _____ 10

The resulting composition was spread on a glass plate, allowed to dry and then baked at a temperature of 125° C. for 1 hour. A control sample was prepared and treated exactly the same way except the sulfonazide was omitted. The modified coating and control were both tested for cross-linking by determining their solubility in an excess of butylacetate. The modified coating was insoluble even after soaking for 18 hours while the control rapidly dissolved.

What I claim and desire to protect by Letters Patent is:

1. A process of modifying a vinyl chloride polymer selected from the group consisting of polyvinyl chloride, vinyl chloride-acrylonitrile copolymers, vinyl chloride-vinyl acetate copolymers, vinyl chloride-vinyl acetal copolymers, vinyl chloride-vinylidene chloride copolymers, and vinyl chloride-1,2-ethylene dicarboxylic acid alkyl ester copolymers which comprises heating said polymer in the presence of an aromatic polysulfonazide.

2. The process of claim 1 wherein the aromatic polysulfonazide is 1,3-benzene bis(sulfonazide).

3. The process of claim 1 wherein the vinyl chloride polymer is polyvinyl chloride.

4. The process of claim 1 wherein the vinyl chloride polymer is a vinyl chloride-vinyl acetate copolymer.

5. The process of claim 1 wherein the vinyl chloride polymer is cross-linked by said modifying process.

6. A vinyl chloride polymer selected from the group consisting of polyvinyl chloride, vinyl chloride-acrylonitrile copolymers, vinyl chloride-vinyl acetate copolymers, vinyl chloride-vinyl acetal copolymers, vinyl chloride-vinylidene chloride copolymers and vinyl chloride-1,2-ethylene dicarboxylic acid alkyl ester copolymers modified with an aromatic polysulfonazide.

7. The product of claim 6 wherein the polysulfonazide is 1,3-benzene bis(sulfonazide).

8. The product of claim 6 wherein the vinyl chloride polymer is polyvinyl chloride.

9. The product of claim 6 wherein the vinyl chloride polymer is a vinyl chloride-vinyl acetate copolymer.

10. An expandable, modifiable vinyl chloride polymer composition comprising a blend of
  (1) a vinyl chloride polymer selected from the group consisting of polyvinyl chloride, vinyl chloride-acrylonitrile copolymers, vinyl chloride-vinyl acetate copolymers, vinyl chloride-vinyl acetal copolymers, vinyl chloride-vinylidene chloride copolymers and vinyl chloride-1,2-ethylene dicarboxylic acid alkyl ester copolymers;
  (2) a blowing agent and
  (3) an aromatic polysulfonazide.

References Cited by the Examiner

UNITED STATES PATENTS

| 2,518,249 | 9/1950 | Ott | 260—2.5 |
| 2,532,243 | 11/1950 | Ott | 260—2.5 |
| 2,668,152 | 2/1954 | O'Neal | 260—2.5 |
| 2,678,293 | 5/1954 | McMillan et al. | 260—2.5 |
| 2,825,282 | 3/1958 | Gergen et al. | 260—2.5 |
| 2,830,029 | 4/1958 | Adams | 260—2.5 |
| 3,058,944 | 10/1962 | Breslow | 260—2.5 |
| 3,137,745 | 6/1964 | Johnstone | 260—2.5 |

MURRAY TILLMAN, *Primary Examiner.*

M. FOELAK, *Assistant Examiner.*